Figure 1:
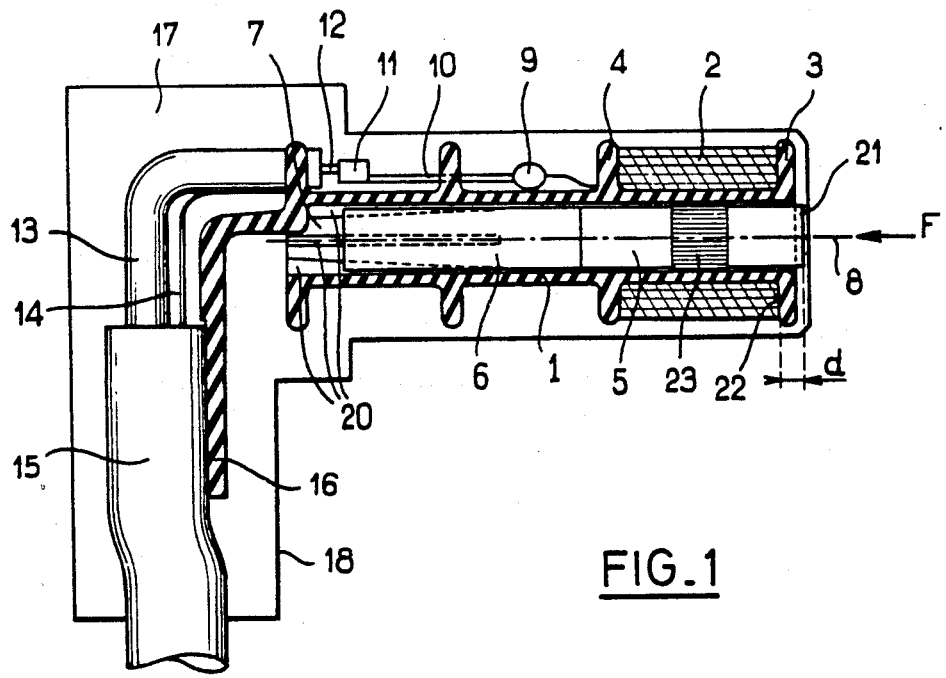

United States Patent [19]

Echasseriau et al.

[11] Patent Number: 4,829,245

[45] Date of Patent: May 9, 1989

[54] VARIABLE RELUCTANCE ELECTROMAGNETIC SENSOR WITH POLE PIECE-MAGNET ASSEMBLY LOCKING MECHANISM AND METHOD OF ASSEMBLY

[75] Inventors: Gilbert Echasseriau; Patrice Oliveau, both of Toulouse, France

[73] Assignee: Bendix Electronics, S.A., Toulouse, France

[21] Appl. No.: 130,056

[22] Filed: Dec. 8, 1987

[30] Foreign Application Priority Data

Dec. 23, 1986 [FR] France .................. 86 18054

[51] Int. Cl.$^4$ .................. G01P 3/488; H01F 27/26; H01F 27/30; G01B 7/30
[52] U.S. Cl. .................. 324/174; 29/607; 324/208; 324/228; 336/90; 336/210
[58] Field of Search .................. 324/72.5, 149, 173, 324/174, 208, 228–230; 246/247, 249; 336/90, 92, 96, 98, 136, 210, 45; 29/602 R, 605–607

[56] References Cited

U.S. PATENT DOCUMENTS

| | | | |
|---|---|---|---|
| 2,838,738 | 6/1958 | Antalek et al. | 336/136 |
| 3,252,024 | 5/1966 | Loudon | 324/174 X |
| 3,649,939 | 3/1972 | Hildebrandt | 336/136 X |
| 3,793,545 | 2/1974 | Leiber et al. | 324/174 X |
| 3,890,517 | 6/1975 | Marsh et al. | 324/173 X |
| 4,510,408 | 4/1985 | Jovick et al. | 324/173 X |
| 4,618,825 | 10/1986 | Fischer | 324/230 |
| 4,652,818 | 3/1987 | Buchschmid et al. | 324/174 |
| 4,670,715 | 6/1987 | Fuzzell | 324/174 X |
| 4,680,543 | 7/1987 | Kohen | 324/208 |

FOREIGN PATENT DOCUMENTS

| | | |
|---|---|---|
| 0194213 | 9/1986 | European Pat. Off. . |
| 2418143 | 10/1975 | Fed. Rep. of Germany . |
| 2928610 | 2/1981 | Fed. Rep. of Germany . |

*Primary Examiner*—Gerard R. Strecker
*Attorney, Agent, or Firm*—Russel C. Wells; Markell Seitzman

[57] ABSTRACT

The invention is in the field of electromagnetic transducers. The sensor according to the invention includes an electrical winding 2 mounted on a carcass 1 hollowed with a cavity 7 which receives a metal pole piece 5 and a permanent magnet 6. According to the invention inclined ribs 20 are formed in the cavity 7 in order to constitute a means of progressively locking the magnet by the wedge effect during the insertion of this magnet and of the pole piece into the cavity. It is thus possible to accurately adjust the distance d which separates the end 21 of the pole piece from a reference surface 22 of the carcass 1. Application to the production of a shaft speed sensor or a wheel speed sensor for a motor vehicle.

11 Claims, 1 Drawing Sheet

U.S. Patent

May 9, 1989

4,829,245

VARIABLE RELUCTANCE ELECTROMAGNETIC SENSOR WITH POLE PIECE-MAGNET ASSEMBLY LOCKING MECHANISM AND METHOD OF ASSEMBLY

The present invention relates to an electromagnetic sensor defining a magnetic circuit whose reluctance varies according to a magnitude to be measured such as the speed or proximity of a moving object for example.

More particularly the invention relates to such a sensor intended for measuring the speed of rotation of a rotating shaft or of a vehicle wheel. The invention also relates to a method of fitting this sensor.

In such an application, the sensor is associated with a disc that is coaxial with a wheel, for example, and rotating with this wheel at the same angular velocity. The disc has geometric irregularities, such as teeth, around its periphery. The sensor normally includes a generally cylindrical body drilled with an axial hole in which a permanent magnet and a contiguous pole piece are housed. An electrical winding is wound on the outside of the body and concentric with the pole piece. The body is mounted with respect to the disc in such a way as to define, between one end of the pole piece and the periphery of the disc, an air gap of width that is variable depending on the position of the teeth of the disc with respect to the pole piece, when the disc and the wheel rotate. This air gap is part of a magnetic circuit whose reluctance then varies with a frequency equal to that of the passage of the teeth of the disc in front of the pole piece of the sensor. The same applies to the voltage signal that can be taken from the terminals of the sensor's winding, a signal which, after shaping, is used to measure the speed of the associated wheel.

When such a sensor is used it is important to fix the position of the face of the free end of the pole piece with respect to the trajectory of the periphery of the disc with great accuracy. In practice it is in fact observed that an axial shift of the end of the pole piece by a few tenths of a millimeter in the direction of increasing air gap can lead to a loss of useful signal. It is therefore appropriate to lock the end of the pole piece in the body of the sensor in a position that is accurately fixed with respect to a reference surface of the sensor which will subsequently be used for marking the position of the sensor with respect to the disc.

According to the technique generally used today for assembling such a sensor, the permanent magnet and the coil are inserted into a cavity in the body of the sensor provided in order to receive them, a simple stop provided in the cavity stopping these parts in this cavity. If, for example, one end of the permanent magnet comes to bear on the stop while the pole piece comes to bear on the other end of the permanent magnet, it can be seen that the accuracy of the position of the free end of the pole piece depends on the tolerance allowed on the length of the magnet, added to that allowed on the length of the pole piece and further increased by that allowed on the accuracy of the position of the stop itself.

This cumulation of tolerances is very unfavourable for the fixing of the free end of the pole piece in an accurate position. It introduces too wide a spread in the position of this end, with the consequence of an unacceptable loss of sensitivity of certain sensors in a batch of sensors assembled using the method described above.

It is therefore an object of the present invention to provide a variable reluctance electromagnetic sensor designed in such a way as to allow the series production of a batch of such sensors with a low spread of sensitivity.

Another object of the present invention is to provide a method of assembling such a sensor.

These objects of the invention are obtained with a variable reluctance electromagnetic sensor of the type which includes a carcass having a cylindrical cavity, a permanent magnet and a metal pole piece contiguously inserted into this cavity such that one end of the pole piece protrudes from the carcass, and an electrical winding wound on the carcass around this cavity in order to provide between its terminals an electrical output signal of the sensor, characterized in that it includes a means of locking by wedging arranged in this cavity in order to act on one end of the assembly formed by the permanent magnet and the pole piece in such a way as to immobilize this assembly in a position in which the end of the pole piece is separated by a predetermined distance d from a chosen reference surface on the carcass.

The permanent magnet/pole piece assembly is fitted in the carcass of the sensor according to the invention by a method according to which the parts of the assembly formed by the permanent magnet and the pole piece are inserted end-to-end into the cavity of this carcass, characterized in that the assembly is pushed into the cavity in such a way that one end of the assembly is progressively subjected to the wedge effect due to the means of locking, the distance which separates the free end of the pole piece from a marked reference surface on the carcass is monitored, and the pushing on the assembly is stopped when this distance is equal to a predetermined value d.

Figure 2:
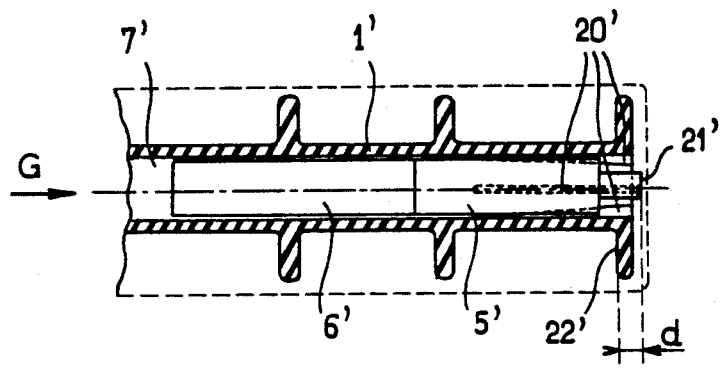

The invention will now be described by way of example with reference to the accompanying drawing in which:

FIG. 1 is a diagrammatic view, partially in axial cross-section, of a sensor according to the invention; and FIG. 2 is a diagrammatic view, in axial cross-section, of part of a second embodiment of a sensor according to the invention.

Reference is made to FIG. 1 where it can be seen that the sensor according to the invention basically comprises a carcass or casing 1 which carries an electrical winding 2 between two flanges 3 and 4, a pole piece 5 and a permanent magnet 6 slipped end-to-end into a cylindrical cavity 7 in the carcass or casing along axis 8.

Each end of the wire of the winding 2 is connected by a soldered joint 9 to a connecting eyelet 10 whose other end is crimped onto the wire 12 of one of the two conductors 13, 14 of a cable 15. For the purposes of drawing clarity, only one connecting eyelet has been shown in FIG. 1.

The carcass 1 has a bracket 16 which is transverse with respect to its axis 8 to be used for supporting and fixing the cable 15. The assembly of parts described above is enclosed in an electrically insulating and mechanically protecting resin using a standard molding/cladding process by injection inside a mold which defines the outer surface 18 of the completed sensor. This can also be partially defined by a protective cover fitted over the cylindrical section of the sensor.

According to the present invention, ribs 20 having a longitudinal profile that is slightly inclined (by a few degrees) to the axis 8 of the cavity 7 of the carcass 1 are formed on the wall of this cavity, in the vicinity of the end opposite that which is filled by the pole piece 5, the base of each rib being parallel to the axis of the cavity.

There can be a variable number of these ribs, four for example, and together they form a means of locking the magnet 6 by the wedge effect. A surface in the shape of a complete truncated cone can be substituted for this set of ribs, the peak of the cone to which this truncated section belongs being on the axis 8 of the cavity 7 to the left of the left end of this cavity, as seen in FIG. 1.

According to a particularly advantageous feature of the present invention, the means of locking formed by this set of ribs or this section of truncated cone is used for automatically and accurately adjusting the distance d which separates the right end surface 21 (as seen in FIG. 1) of the pole piece 5 from a reference surface formed, for example, by the inner surface 22 of the end flange 3 of the carcass 1.

In order to do this, during the assembly of the sensor in an assembly machine, the magnet 6 and the pole piece 5 are successively inserted into the cavity 7 by an insertion tool. The left surface of the magnet 6 is then stopped by the start of the ribs 20, because the diameter of this magnet is smaller than the diameter of the cavity 7 by only a few tenths of a millimeter. Because of the length of the ribs 20, the pole piece which follows the magnet therefore greatly protrudes from the flange 3 of the carcass. The insertion tool then presses on the pole piece 5 in the direction of the arrow F (FIG. 1) in order to force the pole piece-magnet assembly to penetrate into the cavity 7. The left end of the magnet 6 then comes to bear on sections of ribs of increasing height which develop ever increasing forces on this magnet by means of the wedge effect due to the geometry of the ribs 20.

By adjusting the inclination of the rib profiles to the axis 8 and the width of these ribs, these friction forces can be adjusted so that, for a given penetration of the magnet into the cavity 8, these forces suffice to immobilize the magnet in the cavity in the absence of force applied by the tool in the direction of the arrow F. Besides the geometry of the ribs such adjustment of course takes account of the modulus of elasticity of the material forming the ribs and the coefficient of friction of the ribs-magnet interface.

The locking of the magnet in the cavity can be further improved by using a permanent distortion of the ribs obtained by applying to these ribs, using the tool, forces which make the material of the ribs, at the magnet-rib interface, pass into the plastic region, as shown in FIG. 1. There is then a tearing of material on the edges of the ribs. The choice of an appropriate plastic material, such as a polyamide, a polyester or a phenylene polysulphide (PPS), in order to form these ribs, enables this result to be obtained. Advantageously the ribs can be formed integrally with the carcass by molding this plastic material.

According to the invention, the adjustment of the position of the end of the pole piece is carried out by removing the thrust applied by the insertion tool on the pole piece/magnet assembly, when the predetermined distance d is obtained, the geometry and the material of the ribs being chosen such that the removal of the thrust only occurs after the distortion of this material, at the rib-magnet interface, in the elastic region and even, advantageously, in the plastic region.

In order to do this, a feeler forming part of the assembly machine is associated with the insertion tool in order to continuously compare the distance which separates the end of the pole piece on which this tool is applied from the reference surface with the value d during the application of a force by the tool on this pole piece which is then progressively driven into the cavity 7 of the carcass. When the feeler detects that this distance has reached the predetermined value d corresponding with a correct positioning of the pole piece in the carcass, the pressure applied by the insertion tool on this pole piece is removed. The magnet is then wedged in the ribs by elastic or plastic distortion of these ribs and forms a stop, with its right end, for the left end of the pole piece which bears on the magnet. A knurling 23 formed over at least part of the cylindrical surface of the pole piece enables a friction that is sufficient for preventing an axial sliding of the pole piece in this cavity to be produced between this part and the cavity 7.

According to a particular embodiment of the invention, there is chosen, as a reference surface, the interior surface 22 of the flange 3 in order to provide an accurate referencing of the end 21 of the pole piece with respect to the winding 2 which touches this surface. In this way there is no dependence on the tolerance on the axial thickness of this flange 3 which would be necessary to be taken into account if the outer surface of the flange 3 had been taken as the reference surface.

The winding 2 being formed on the carcass, the magnet and the pole piece fixed in this carcass in the predetermined position, the cable 15 mounted on the sensor and the wires of the winding 2 connected to the conductors 13, 14, of the cable by means of the connecting eyelets, the manufacture of the sensor according to the invention is completed by cladding the sensor with an electrically insulating and mechanically protecting resin, made from thermoplastic or thermosetting material.

This operation is carried out using the molding technique by injection in a mold defining the volume and the outer surface 18. Advantageously, the section of this volume which encloses the winding and the adjacent end surface of the sensor can be protected by a cap made from stainless steel, aluminum or a thermoplastic material, the base of this cap touching the adjacent end of the pole piece. The thickness of the base of the cap must of course be carefully calibrated and, in a batch, must have a low manufacturing spread in order not to unfavourably react on that of the sensitivities of the sensors in the batch. The magnet/pole piece assembly is then completely axially immobilized in the cavity 7, between the ribs 20 and the cap. An injection of resin against the left end of the magnet, carried out during the molding can perfect this immobilization.

Thus, because of the present invention, the tolerances on the lengths of the pole piece and of the magnet have no effect on the spread of the position -d of the end of the pole piece in a batch of sensors assembled using the method according to the invention. It will be observed that the effect of these tolerances in the assembly methods of the prior art is particularly pernicious as their effects are cumulative when it is not taken into account in the axial positioning of the magnet/pole piece assembly in the carcass.

FIG. 2 shows part of a sensor according to another embodiment of the invention which also illustrates a variant of the assembly method according to the invention. Parts similar to those of the sensor in FIG. 1 are referenced by the same numbers but given a "prime". The carcass 1' of this sensor is designed to enable the insertion of the pole piece 5' and of the magnet 6' through the end of the cavity 7' which is opposite that from which the pole piece protrudes once the sensor is completed.

Ribs 20' are therefore formed in the cavity 7', in the vicinity of the flange 3' of the carcass (at the right of FIG. 2). After insertion of the pole piece 5' and of the magnet 6' in the cavity, a tool pushes the assembly into the cavity by acting axially on the magnet 6', in the direction of the arrow G. It is therefore the pole piece which becomes wedged on the ribs 20', according to the wedging procedure described with reference to FIG. 1. It will be noted that the diameter of the end 21' of the pole piece 5' is reduced in order to adapt to the presence of the ribs in the vicinity of the flange 3' of the carcass 1'. As for the embodiment shown in FIG. 1, an injection of resin locks the magnet and the pole piece in the cavity 7' of the carcass 1'.

As for the embodiment shown in FIG. 1, a feeler measures the axial position of the end 21' of the pole piece with respect to a reference surface of the carcass of the sensor, and controls the stopping of the thrust of the insertion tool when the distance between the ends 21' and 22' reaches a predetermined value d.

The invention is of course not limited to the embodiments described and shown. For example, the ribs or the truncated cone section 20, 20', could be formed on a ring that is independent of the carcass 5, 5', and inserted in the cavity 7, 7', before the pole piece and the magnet. Likewise, these two latter parts could be preassembled before they are inserted into this cavity.

We claim:

1. A variable reluctance electromagnetic sensor comprising:
   tubular casing having a cavity;
   reference surface mark means on the outside of said tubular casing near one end thereof;
   an electrical coil wound around said casing, one end of said coil coincident with said reference surface mark means;
   an assembly comprising a permanent magnet and a pole piece inserted end to end in said cavity;
   said end of said pole piece opposite said permanent magnet being the free end, said free end being positioned a predetermined distance form said reference surface mark means; and
   locking means for wedging said assembly in said cavity, said locking means having a truncated conical surface progressively reducing the diameter of said cavity from a point intermediate the ends of said cavity towards an end of said cavity.

2. A sensor according to claim 1, wherein said locking means comprises a group of ribs integral to and spaced around the wall of said cavity, the foot of each of said ribs being parallel to the axis of said cavity and the edge for each of said ribs inclined to said axis for progressively reducing the diameter of said cavity from a point intermediate the ends of said cavity towards an end of said cavity.

3. A sensor according to claim 2, characterized in that said ribs are regularly distributed over the wall of said cavity.

4. A sensor according to claim 1, characterized in that said locking means immobilizes one end of said magnet.

5. A sensor according to claim 1, wherein said pole piece has a peripheral knurling so that it is retained in said cavity by friction.

6. A sensor according to claim 1 wherein said locking means immobilizes one end of said pole piece.

7. A sensor according to claim 1, additionally including a resin securing the end of said magnet opposite said pole piece.

8. A method of assemblying a variable reluctance electromagnetic sensor comprising the steps of:
   securing a tubular casing having a cavity;
   providing locking means in one end of said tubular casing;
   marking a reference mark on said casing a predetermined distance from an end of said cavity;
   winding an electrical coil around the casing with one end of said coil coincident with said reference mark;
   inserting end-to-end into said cavity an assembly comprising a permanent magnet and a pole piece until said assembly is wedged in said cavity by said locking means;
   monitoring the distance form the free end of the pole piece from a reference surface marked on the casing; and then
   removing the wedging insertion pressure from the assembly when said distance equals a predetermined value d.

9. A method according to claim 8, characterized in that, on removing the pressure, said locking means is in a state of elastic distortion.

10. A method according to claim 8, characterized in that, on removing the pressure, said locking means is in a state of plastic distortion.

11. A method according to claim 8, additionally including the step of injecting resin into said cavity for securing the locking of the magnet and the pole piece.

* * * * *